Patented Jan. 19, 1932

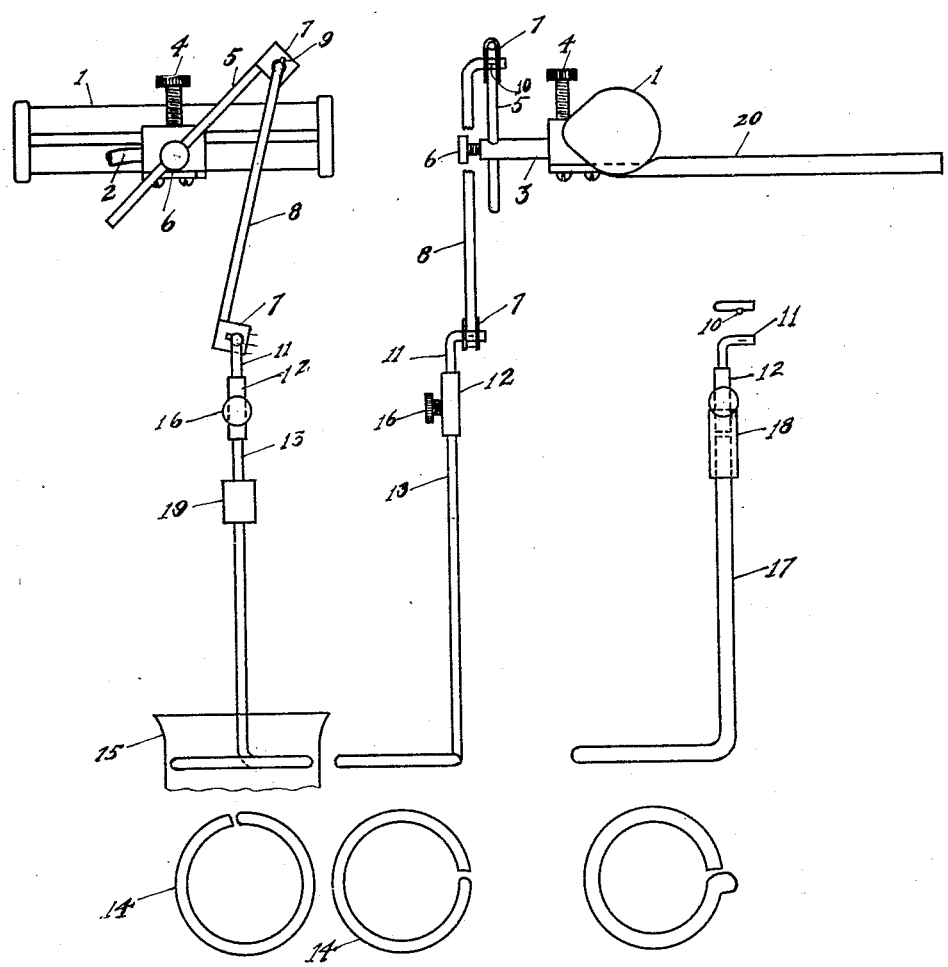

1,841,756

UNITED STATES PATENT OFFICE

ARMAND V. MOTSINGER, OF EDGEWOOD ARSENAL, MARYLAND

LABORATORY STIRRER

Application filed May 6, 1929. Serial No. 360,827.

This invention relates to agitators or stirrers, and more particularly to a simple and convenient stirrer for use in a laboratory.

One of the objects of this invention is to provide an agitator or stirrer operated by vacuum or pressure, that can be conveniently attached, for example, to a laboratory ring stand for stirring purposes.

Another object of this invention is to provide a reciprocating stirrer operated by vacuum or pressure, having adjustments whereby the speed and stroke of the stirrer may be regulated.

Another object of this invention is to provide a handy laboratory stirrer having adjustable speed and stroke and having interchangeable stirring attachments of various useful sizes, shapes and materials.

A further object of the invention is to provide, in a manner as hereinafter set forth, a device of the character referred to, which is very simple in its method of assembly and use, having very few and simple parts, highly efficient for its intended purpose and thoroughly reliable in its operation, which is adapted to be used with standard laboratory equipment, automatic in its operation, and which is comparatively inexpensive to manufacture.

With the foregoing and other objects in view, the invention consists in the novel arrangement, combination and construction of parts as will be hereinafter more specifically described and illustrated in the accompanying drawings, wherein is shown an embodiment of the invention, but it is to be understood that changes, variations, and modifications may be resorted to, which fall within the scope of the claims hereunto appended.

In the drawings wherein like reference characters designate like parts throughout the several views:

Figure 1 is a front view of the stirrer showing part of a beaker in which the stirring attachment operates.

Figure 2 is a side view of the stirrer, showing the rod attached to the stirring mechanism, for holding the device, as it may be applied, in a ring stand clamp holder.

Figure 3 is a side view of a glass stirring attachment showing a method of attaching a large stirring rod.

Referring to the drawings in detail 1 indicates a mechanism operated by pressure or vacuum transmitted through a rubber tube 2. Consider for example the mechanism being operated by vacuum. Air is drawn from one side of the piston in the cylinder 1 creating a partial vacuum in one end of the cylinder on one side of the piston. Atmospheric pressure on the other side of the piston pushes the piston towards the end partially evacuated. The piston, near the end of its travel, acts on a lever which operates a valve, changing the suction to the opposite side of the piston. The piston then moves to the newly partially evacuated end of the cylinder 1. There the piston also acts on the lever operating the valve which changes the suction to the opposite end of the cylinder. This cycle is repeated, thus operating the air sealed piston in a reciprocating motion. Any convenient form of a valve is used to alternate the suction from one end of the cylinder to the other. A simple slide valve may be used. A shaft 3 normal to the axis of the cylinder is geared to the piston inside of the cylinder 1 so that the reciprocating motion of the piston moves the shaft in a reciprocating circular motion. The speed of the mechanism is adjusted by a thumb screw 4, which varies the suction or pressure. An arm 5 attaches to the shaft 3 through a hole normal to the axis of the shaft and is held rigid by a thumb screw 6 which screws axially into the shaft 3 and abuts against the arm 5. The length of the arm 5 may be varied by releasing the thumb screw 6 and slipping the arm in the shaft 3. Attached to the end of the arm is a U-shaped piece of metal 7, having holes centered in each of its opposite legs for bearing of a bent rod or wire 8. The holes in the U-shaped piece 7 have slots 9 through which a crimp or projection 10 on the wire 8 may be slipped by turning the wire 8, 180° from its operating position. In the operating position the projection 10 is between the arms of the U and is 180° from the slot 9, thereby holding the connecting arm 8 in position. The connecting arm 8 is bent at 90° at its top end and works in the slotted holes as above described. The bottom end of the connecting arm 8 has a U-shaped piece of metal 7 attached thereto, similar to the part 7 connected to the arm 5. A short wire 11 has its top end bent at 90° to work in the U attached to the connecting arm 8 and is held in place by means of a projection as above described. Attached to the bottom of the wire 11, by soldering, or any other method of rigid attachment, is a sleeve 12. The stirring attachment 13 consists of a wire or rod made of any suitable material having its bottom bent in the form of a circle 14, or any other suitable shape, and whose plane is normal to the axis of the wire. The stirring attachment 13 moves in a reciprocating manner, stirring whatever is in the beaker or test tube 15. Instead of the circular loop in the stirring attachment, a flat or twisted ring may be suitably attached to a wire and fastened in the sleeve 12. The stirring attachment, if a wire, is held in the sleeve 12 by being inserted into a hole drilled axially in the sleeve and held in place by a thumb screw 16. If a large glass stirring rod 17 is used it is connected to the sleeve 12 by means of a piece of rubber tubing 18 slipped over the stirring rod 17 and sleeve 12. It is intended to have different sizes and kinds of interchangeable stirring attachments for attachment to the sleeve 12. A guide 19, a common stopper or cork, is attached to the ring stand by means of a clamp and guides the top of the stirring attachment, which slides in a hole bored axially in the center of the stopper. The stirrer is held by means of a rod 20 rigidly attached thereto and which may be clamped into a standard laboratory ring stand clamp holder. The rubber tube 2 attaches to the stirring operating mechanism and source of vacuum or pressure. A laboratory water suction pump has been found to give enough vacuum to operate the stirrer.

The illustration shows a connecting wire 8 connecting the arm 5 and stirring attachment wire 11. It has been found satisfactory and more simple when stirring solutions in an open beaker to connect the stirring attachment wire 11 directly to the agitating arm 5.

A modification of the stirrer might be made by attaching the stirring means directly to the reciprocating piston in the operating mechanism 1, or the stirring attachment might be linked with the operating mechanism by means of a pinion on the shaft 3 and rack gear on the stirring rod.

While the application of the device has been described and illustrated as a handy stirring device for use in a laboratory, it is within the contemplation of the invention to use the same, made possibly in larger sizes, for stirring or agitating means in manufacturing processes.

What I claim as new is:

1. In combination an automatic, stirring device of the character described, comprising a mechanism operated by suction, means for connecting the mechanism to a ring stand clamp holder, driving means comprising a crank arm pivotally connected at one end to said mechanism, stirring means comprising a dasher rod with dasher off center, linking means to connect the free end of said crank arm to said dasher rod, so that said dasher rod will be given a reciprocal motion by said mechanism, means for infinitely adjusting the stroke of said mechanism by varying the length of said reciprocating arm, means on the device for infinitely adjusting the speed of the operating mechanism, removable parts consisting of said link and said dasher rod, and means for detachably connecting the said parts together, said parts to have a projection means on the journal part to enter and lock into bearing means of the connecting part thereby holding the journal part in place in its connecting part, said connecting part or bearing to have means through which the journal key may slip and be locked on turning the journal in the bearing part.

2. In combination, an automatic stirring device of the character described, comprising a pneumatically operated mechanism, means for connecting the mechanism to a ring stand clamp holder, a shaft carried by said mechanism and adapted to be oscillated thereby, an arm connected to said shaft and adapted to be swung in an arcuate path, stirring means comprising a dasher rod with a hollow dasher attached at its periphery, means for connecting the free end of said arm to said rod, means for infinitely adjusting the stroke of said stirrer, means on the device for adjusting the speed of the operating mechanism, and means for detachably connecting the various parts together, said parts to have a projection means on the journal to enter and lock into bearing means of the connecting part thereby holding the journal in place in its bearing, bearing to have means through which the journal key may slip and be locked on turning the journal in the bearing part.

3. In combination, a pneumatically operated motor of the class described, a shaft extending from the casing of said motor, means for adjusting the speed of said shaft, a crank arm extending through the shaft and adjustable with respect to the same so as to produce a variable stroke, a circular stirrer and means connecting said crank arm and said stirrer so that stirrer will be given a combined reciprocating and angular displaced motion with respect to the surface of substance being stirred.

4. In combination, an automatic stirring device comprising a stirring attachment, a mechanism operated by suction including a shaft oscillatably connected to said mechanism, a support for said mechanism, a rod fixedly carried by said shaft for oscillation therewith, a second rod pivotally connected at one end with said first mentioned rod, means detachably, pivotally, connecting the free end of said second rod with the stirring attachment.

5. In combination, an automatic stirring device comprising a stirring attachment, a cylinder, a shaft rotatably mounted therein, suction means operatively connected to oscillate said shaft, a member secured to said shaft for oscillation therewith, a second member pivotally connected to said first member in eccentric relation to said shaft, means on said second member and spaced a substantial distance from said pivotal connection for detachable connection with said stirring attachment.

6. In an agitating device, an actuating member, a rod pivotally connected therewith adjacent one side, bracket means adjacent the other side, a stirring device having a ring shaped agitator with a single stirrer rod extending upwardly therefrom at one side, a sleeve member, an L-shaped member, the sleeve member fitting over one end of the L-shaped member and the end of the stirrer rod, the other end of the L-shaped member secured to said rod.

In testimony whereof I affix my signature.

ARMAND V. MOTSINGER.